United States Patent
Zhou et al.

(10) Patent No.: US 7,771,871 B2
(45) Date of Patent: Aug. 10, 2010

(54) NANOCRYSTAL OXIDE/GLASS COMPOSITE MESOPOROUS POWDER OR THIN FILM, PROCESS FOR PRODUCING THE SAME, AND UTILIZING THE POWDER OR THIN FILM, VARIOUS DEVICES, SECONDARY BATTERY AND LITHIUM STORING DEVICE

(75) Inventors: Haoshen Zhou, Ibaraki (JP); Itaru Homma, Ibaraki (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 1119 days.

(21) Appl. No.: 10/595,856

(22) PCT Filed: Nov. 16, 2004

(86) PCT No.: PCT/JP2004/016981

§ 371 (c)(1),
(2), (4) Date: May 16, 2006

(87) PCT Pub. No.: WO2005/047199

PCT Pub. Date: May 26, 2005

(65) Prior Publication Data

US 2007/0027015 A1   Feb. 1, 2007

(30) Foreign Application Priority Data

Nov. 17, 2003 (JP) ............................. 2003-386694
Sep. 17, 2004 (JP) ............................. 2004-271984

(51) Int. Cl.
- H01M 4/00 (2006.01)
- H01M 4/58 (2006.01)
- C25B 11/00 (2006.01)
- C01B 25/12 (2006.01)
- C01B 13/14 (2006.01)

(52) U.S. Cl. .................... 429/218.1; 429/220; 429/221; 429/223; 429/224; 429/231.5; 429/231.95; 204/284; 423/304; 423/592.1; 977/781

(58) Field of Classification Search .............. 429/218.1, 429/220, 221, 223, 224, 231.5, 231.95; 423/304, 423/592.1; 204/284; 977/781
See application file for complete search history.

(56) References Cited

U.S. PATENT DOCUMENTS 5,622,684 A   4/1997  Pinnavaia et al. ........... 423/702

(Continued)

FOREIGN PATENT DOCUMENTS

JP   2001-233615   8/2001

(Continued)

OTHER PUBLICATIONS

C.T. Kresge et al., Abstract of "Ordered Mesoporous Molecular Sieves Synthesized by a Liquid-Crystal Template Mechanism", Nature, vol. 359, pp. 710-712, Oct. 22, 1992.

*Primary Examiner* — Patrick Ryan
*Assistant Examiner* — Julian Mercado
(74) *Attorney, Agent, or Firm* — Howson & Howson LLP

(57) ABSTRACT

The present invention aims to realize (1) manufacture of a mesoporous composite powder or thin film composed of nanocrystalline metal oxide—glass having a three-dimensional structure with a large specific surface area, (2) construction of a porous structure framework with nanocrystalline metal oxide crystal and a slight amount of glass phase ($SiO_2$ or $P_2O_5$, $B_2O_3$), (3) control of crystal growth of metal oxide with a slight amount of glass phase ($SiO_2$ or $P_2O_5$, $B_2O_3$), (4) simplification of the manufacturing process, and (5) use thereof in manufacture of a lithium intercalation electric device, photocatalytic device, solar battery and energy storage device. Provided are a nanocrystal oxide—glass mesoporous composite powder or thin film having a three-dimensional structure with regularly arranged mesopores, and a secondary battery comprising the same.

30 Claims, 13 Drawing Sheets

U.S. PATENT DOCUMENTS

| | | | |
|---|---|---|---|
| 5,795,559 A | 8/1998 | Pinnavaia et al. | 423/702 |
| 6,025,094 A * | 2/2000 | Visco et al. | 429/231.95 |
| 7,087,348 B2 * | 8/2006 | Holman et al. | 429/209 |
| 7,202,000 B2 * | 4/2007 | Iriyama et al. | 429/231.95 |
| 2003/0003364 A1 * | 1/2003 | Mori et al. | 429/231.95 |
| 2003/0054954 A1 | 3/2003 | Chane-Ching et al. | 502/304 |
| 2003/0205467 A1 * | 11/2003 | Fu | 204/424 |
| 2004/0126659 A1 * | 7/2004 | Graetz et al. | 429/218.1 |

FOREIGN PATENT DOCUMENTS

| | | |
|---|---|---|
| JP | 2002-042808 | 2/2002 |
| JP | 2002-338228 | 11/2002 |
| JP | 2003-077466 | 3/2003 |
| JP | 2003-077541 | 3/2003 |
| JP | 2004-214116 | 7/2004 |

OTHER PUBLICATIONS

J.S. Beck et al., "A New Family of Mesoporous Molecular Sieves Prepared with Liquid Crystal Templates", Journal of American Chemical Society, vol. 114, pp. 10834-10843, Nov. 22, 1992.

Peidong Yang et al., "Generalized Syntheses of Large-Pore Mesoporous Metal Oxides with Semicrystalline Frameworks", Nature, vol. 396, pp. 152-155, Nov. 12, 1998.

Donglin Li et al., "Design and Synthesis of Self-Ordered Mesoporous Nanocomposite Through Controlled In-Situ Crystallization", Nature, vol. 3, pp. 65-72, Dec. 21, 2003.

* cited by examiner

NANOCRYSTAL OXIDE/GLASS COMPOSITE MESOPOROUS POWDER OR THIN FILM, PROCESS FOR PRODUCING THE SAME, AND UTILIZING THE POWDER OR THIN FILM, VARIOUS DEVICES, SECONDARY BATTERY AND LITHIUM STORING DEVICE

BACKGROUND OF THE INVENTION

The present invention generally relates to a mesoporous composite powder or thin film having a three-dimensional structure with regularly arranged mesopores and having nanocrystalline metal oxide—glass in the porous structure framework; the manufacturing method thereof; a lithium battery, lithium intercalation electric device, photocatalytic device, solar battery, energy storage device and rechargeable battery as the specific applications thereof; in particular to a secondary battery having a nanocrystal oxide—glass mesoporous composite electrode material to be used as an electrode of a lithium battery.

Although application of a metal oxide mesoporous material in an electronic material, catalyst material, functional ceramic material and electrode material by having a three-dimensional structure with regularly arranged nanopores and a high specific surface area is expected, the current situation is that it is not possible to elicit the crystalline functions since the metal oxide in the framework is amorphous.

Further, groups worldwide are attempting various methods, but the nanostructure that is regularly arranged three-dimensionally will be crushed when metal oxide is subject to crystal growth in a nano-order framework, and there has been no successful experience heretofore.

There has been success in synthesizing MCM41 (hexagonal) and MCM48 (cubic) mesoporous silica ($SiO_2$) powder with a surface active agent as the template (refer to Documents 1 and 2). Nevertheless, the current situation is that there has been no further technical advancement since then.

Further, today, metal oxide is frequently used as the active material for both the positive electrode and negative electrode of lithium batteries; in particular, rechargeable (secondary) lithium batteries on a worldwide scale of 10 trillion JPY.

Conventional metal oxide as the active material has a large particle size, and, since the electronic conductive path and ionic conductive path demanded in high-speed secondary batteries do not coexist, it is difficult to achieve a high rate of charging/discharging.

In order to improve the performance of batteries, miniaturization of particles or pores and enlargement of the specific surface area are demanded. Nevertheless, the current situation is that the various miniaturization methods proposed to date are not able to realize stable, high capacity under high rate charging/discharging conditions.

As a result, synthesis of metal oxide having high reversible capacity and superior cycle characteristics even at a high charging or discharging rate is desired.

As an example of a metal oxide material, there is mesoporous metal oxide. This mesoporous metal oxide having regularly arranged pores was reported in 1998 by Stucky et al (refer to Non-Patent Document 3).

Nevertheless, since these mesoporous metal oxides are amorphous, there is a problem in that it lacks stability as an electrode material. Applicant has succeeded in synthesizing nanocrystal oxide—glass mesoporous composite in 2004 (refer to Non-Patent Document 4 and Patent Document 1).

This nanocrystal oxide—glass mesoporous composite attracted much attention, and application as a catalyst carrier or dye-sensitized solar battery, lithium storage material, electrochemical dual-layer capacitor (EDLCs) has been proposed.

[Non-Patent Document 1] C. T. Kresge, M. E. Leonowicz, W. J. Roth, J. C. Vartuli, J. S. Beck, *Nature* 1992, 359, 710.

[Non-Patent Document 2] J. S. Beck, J. C. Vartuli, W. J. Roth, M. E. Leonowicz, C. T. Kresge, K. D. Schmitt, C. T.-W. Chu, D. H. Olson, E. W. Sheppard, S. B. McCullen, J. B. Higgins, J. L. Schlenker, *Journal American Chemical Society.* 1992, 114, 10834.

[Non-Patent Document 3] P. Yang, D. Zhao, D. I. Margolese, B. F. Chmelka, G. D. Stucky, Nature, 1998, 396, 152

[Non-Patent Document 4] D. Li, H. Zhou, I. Honma, Nature Materials, 2004, 3, 65

[Patent Document 1] Japanese Patent Application No. 2003-386694

SUMMARY OF THE INVENTION

The present invention aims to realize (1) manufacture of a mesoporous composite powder or thin film composed of nanocrystalline metal oxide—glass having a three-dimensional structure with a large specific surface area, (2) construction of a porous structure framework with nanocrystalline metal oxide crystal and a slight amount of glass phase ($SiO_2$ or $P_2O_5$, $B_2O_3$), (3) control of crystal growth of metal oxide with a slight amount of glass phase ($SiO_2$ or $P_2O_5$, $B_2O_3$), (4) simplification of the manufacturing process, and (5) use thereof in manufacture of a lithium intercalation electric device, photocatalytic device, solar battery and energy storage device.

The present invention also aims to realize, for use in a secondary battery, (6) manufacture of a mesoporous metal oxide of a three-dimensional structure having active metal oxide nanocrystals in a nanoporous structure framework; (7) a nanoporous structure framework containing an electronic conductive path and ionic conductive path; (8) maintenance of high reversible capacity (e.g.: $Li_xTiO_2$: x=0.5 to 0.8) in the capacity after several hundred cycles even at a high charging/discharging rate of 10 A/g; and (9) development of a secondary battery having a metal oxide electrode material capable of maintaining a high reversible capacity (e.g.: $Li_xTiO_2$: x=0.5 to 0.8) even when the charging/discharging rate is increased from 0.1 A/g to 0.5 A/g, 2.0 A/g, or 10 A/g.

The present invention provides 1) nanocrystal oxide—glass mesoporous composite powder or thin film having a three-dimensional structure with regularly arranged mesopores; 2) a nanocrystal oxide—glass mesoporous composite powder or thin film having a hexagonal or cubic three-dimensional structure; 3) the nanocrystal oxide—glass mesoporous composite powder or thin film according to 1) or 2) above, wherein a porous structure framework contains uniform nanocrystal oxides; and 4) the nanocrystal oxide—glass mesoporous composite powder or thin film according to any one of 1) to 3) above having a large specific surface area in the range of 50 to 400 $m^2/g$.

The present invention also provides 5) a manufacturing method of nanocrystal oxide—glass mesoporous composite powder, comprising the steps of: using a block macromolecule or interface activating agent as a template, and adding hydrochloric acid (HCl) to a metal alkoxide or metal chloride, or an aqueous solution of $PO(OC_2H_5)_3$ or $Si(OC_2H_5)_4$ (TEOS) or a solution obtained by dissolving these in alcohol such as ethanol; manufacturing powder having a glass phase metal oxide—inorganic oxide composite mesostructure with a sol-gel process; maturing and gelling this between room temperature and 90° C.; removing the block macromolecule or interface activating agent by performing heat treatment thereto in the atmosphere at 350 to 400° C. and manufacturing a glass phase metal oxide—glass phase mesoporous composite powder; and additionally performing heat treatment thereto at 400 to 700° C. so as to change the phase of the glass phase metal oxide into crystallite.

The present invention also provides 6) a manufacturing method of nanocrystal oxide—glass mesoporous composite thin film, comprising the steps of: using a block macromolecule or interface activating agent as a template, adding hydrochloric acid (HCl) to a metal alkoxide or metal chloride, or an aqueous solution of $PO(OC_2H_5)_3$ or $Si(OC_2H_5)_4$ (TEOS) or a solution obtained by dissolving these in alcohol such as ethanol, and obtaining a sol solution by performing hydrolysis while adjusting the pH; forming a thin film having a glass phase metal oxide—inorganic oxide—block macromolecule (or interface activating agent) composite mesostructure on a substrate by delivering the sol solution in drops onto a substrate, rapidly rotating the substrate, and evaporating and gelling the solvent; maturing and gelling this between room temperature and 90° C.; removing the block macromolecule or interface activating agent by performing heat treatment thereto in the atmosphere at 350 to 400° C. and manufacturing a glass phase metal oxide glass phase mesoporous composite thin film; and additionally performing heat treatment thereto at 400 to 700° C. so as to change the phase of the glass phase metal oxide into crystallite.

The present invention also provides 7) the manufacturing method of nanocrystal oxide—glass mesoporous composite powder or thin film according to 5) or 6) above, wherein an inorganic oxide of a stable glass phase is $SiO_2$, $P_2O_5$ and $B_2O_3$.

The present invention also provides 8) the manufacturing method of mesoporous powder or thin film according to any one of 5) to 7) above, wherein a dissimilar metal oxide such as $MnO_2$, $NiO$, $Fe_2O_3$, $CuO$, $Li_2O$, $WO_3$, $SnO_2$ is added in a slight amount at the synthesizing stage, and the mesoporous powder or thin film is formed from a nanocrystal oxide—a glass phase inorganic oxide—dissimilar metal oxide ($—MnO_2$, $—NiO$, $—Fe_2O_3$, $—CuO$, $—Li_2O$, $—WO_3$, $—SnO_2$ or the like) having a multicomponent glass phase.

The present invention also provides 9) the manufacturing method of nanocrystal oxide—glass mesoporous composite powder or thin film according to any one of 5) to 8) above, wherein metal alkoxide or metal chloride is $Ti(OC_3H_7)_4$, $Zr(OC_4H_9)_4$, $NbCl_5$, $LiCl$, $NiCl_2$, $FeCl_3$, $CuCl_2$, $MnCl_2$, $SnCl_4$ or $WCl_5$.

The present invention also provides 10) a lithium battery, lithium intercalation electric device, photocatalytic device, solar battery or energy storage device using the nanocrystal oxide—glass mesoporous composite powder or thin film manufactured according to any one of 5) to 9) above.

Further, the present inventors discovered that characteristics of the foregoing crystallite mesoporous metal oxide can be utilized and applied to a secondary battery.

Based on this discovery, the present invention provides: 11) a secondary battery configured with a nanocrystal oxide—glass mesoporous composite electrode having a three-dimensional structure with regularly arranged mesopores; 12) the secondary battery according to 11) above, wherein the average diameter of pores is 2 nm to 10 nm; 13) the secondary battery according to 11) or 12) above, wherein a framework of nanocrystal oxide—glass mesoporous composite having a hexagonal or cubic structure contains uniform crystallite oxides of several nano-orders; 14) the secondary battery according to any one of 11) to 13) above, wherein the thickness of a wall of the framework is 2 to 9 nm; and 15) the secondary battery according to any one of 11) to 14) above, wherein the nanocrystal oxide is one or more types of metal oxides selected from $TiO_2$, $NiO$, $MnO_2$, $FeO$, $Fe_2O_3$, $Fe_3O_4$, $CoO$, $CoO_2$, $CrO_2$, $Co_3O_4$, $WO_3$, $SnO$ and $SnO_2$.

The present invention also provides 16) the secondary battery according to any one of 11) to 15) above, wherein the glass phase is one or more types of inorganic oxides selected from $P_2O_5$, $SiO_2$ and $B_2O_3$; 17) the secondary battery according to any one of 11) to 16) above, wherein the glass phase is a multicomponent glass phase containing one or more types of dissimilar metal oxides selected from $MnO_2$, $NiO$, $Fe_2O_3$, $CuO$, $Li_2O$, $WO_3$ and $SnO_2$ at a molar ratio of 2% to 60% in relation to the glass phase; 18) the secondary battery according to any one of 11) to 16) above, wherein both an ionic conductive path and electronic conductive path are provided in the framework by adding ion conductive or electron conductive dissimilar metal oxides in a network-shaped glass phase at a molar ratio of 2% to 60% in relation to the glass phase; and 19) the secondary battery according to any one of 11) to 18) above, wherein the nanocrystal oxide—glass mesoporous composite is used as the electrode of the secondary battery, and the energy density of charging (or discharging) is able to maintain a rate of 60% to 70% of 0.1 A/g even when increasing the charging (or discharging) rate to ten times 0.1 A/g (1.0 A/g), and even one hundred times 0.1 A/g (10 A/g).

The present invention also provides 20) the secondary battery according to any one of 11) to 19) above, wherein the nanocrystal oxide—glass mesoporous composite is used as the electrode of the secondary battery so as to increase the surface area, and the charging/discharging capacity has a large capacity of 1.0 to 5.0 times the maximum theoretical capacity in relation to active oxides; 21) the secondary battery according to any one of 11) to 20) above, wherein the nanocrystal oxide—glass mesoporous composite is used as the electrode of the secondary battery, and a high reversible ratio of 95% or higher is realized even when increasing the charging (or discharging) rate to ten times 0.1 A/g (1.0 A/g), and even one hundred times 0.1 A/g (10 A/g); and 22) the secondary battery according to any one of 11) to 21) above, wherein the nanocrystal oxide—glass mesoporous composite is used as the electrode of lithium, and a high reversible capacity of 60% to 70% of the initial capacity is realized after a charging/discharging cycle of several hundred cycle even when increasing the charging (or discharging) rate to ten times 0.1 A/g (1.0 A/g), and even one hundred times 0.1 A/g (10 A/g).

The present invention also provides 23) the secondary battery according to any one of 11) to 21) above, wherein nanocrystalline metal oxide—the glass phase inorganic oxide—dissimilar metal oxide to which a slight amount of dissimilar metal oxide was added has a high reversible capacity at a rate of 40% to 70% or higher of 0.1 A/g even when the charging/discharging rate is increased to a rate of one hundred times, five hundred times or one thousand times 0.1 A/g; 24) the secondary battery according to any one of 11) to 23) above having a high reversible ratio (r>95%); and 25) a lithium storage device such as a capacitor or super capacitor according to any one of 11) to 24) above utilizing oxidization/reduction of lithium ion.

The present invention also provides 26) a manufacturing method of a secondary battery configured from a nanocrystal oxide—glass mesoporous composite electrode manufactured with the steps of: using a block macromolecule or interface activating agent as a template, and adding hydrochloric acid (HCl) to a metal alkoxide or metal chloride, or an aqueous solution of $PO(OC_2H_5)_3$ or $Si(OC_2H_5)_4$(TEOS) or a solution obtained by dissolving these in alcohol such as ethanol; manufacturing powder having a glass phase metal oxide— inorganic oxide composite mesostructure with a sol-gel process; maturing and gelling this between room temperature and 90° C.; removing the block macromolecule or interface activating agent by performing heat treatment thereto in the atmosphere at 350 to 400° C. and manufacturing a glass phase metal oxide—glass phase mesoporous composite powder; and additionally performing heat treatment thereto at 400 to 700° C. so as to change the phase of the glass phase metal oxide into crystallite; and 27) a manufacturing method of a secondary battery configured from a nanocrystal oxide—glass phase inorganic oxide—dissimilar metal oxide mesoporous electrode according to 26) above, wherein a dissimilar metal oxide such as $MnO_2$, $NiO$, $Fe_2O_3$, $CuO$, $Li_2O$, $WO_3$, $SnO_2$ is added in a slight amount at the synthesizing stage, and the mesoporous powder or thin film is formed from a nanocrystal oxide-a glass phase inorganic oxide—dissimilar metal oxide (—$MnO_2$, —$NiO$, —$Fe_2O_3$, —$CuO$, —$Li_2O$, —$WO_3$, —$SnO_2$ or the like) having a multicomponent glass phase.

Not only is this manufacturing method of a nanocrystal oxide——glass mesoporous composite powder or thin film having a three-dimensional structure an extremely simple method, it is also possible to control the size and structure of the pores, the surface area is large, has a regularly arranged hexagonal or cubic structure, and the porous structure framework is structured from nanocrystalline metal oxide crystal and a slight amount of glass phase ($SiO_2$ or $P_2O_5$). The present invention yields a superior effect in that it is able to obtain the foregoing nanocrystal oxide—glass mesoporous composite powder or thin film, and mesoporous composite formed from nanocrystalline metal oxide—a glass phase inorganic oxide—dissimilar metal oxide having an electronic conductive path and ionic conductive path.

Further, as a result, it is possible to obtain a secondary battery having a large capacity and superior charging/discharging cycle characteristics even at a fast charging/discharging rate (e.g., 10 A/g, 20 A/g, 50 A/g). A significant effect is yielded in that a high reversible ratio (r>96%) can be maintained even after several hundred cycles.

DETAILED DESCRIPTION OF THE INVENTION

Specific examples of the present invention described below are not intended to limit the present invention in any way. In other words, modifications, other embodiments and examples based on the technical spirit of the present invention are all covered by this invention.

The nanocrystal oxide—glass mesoporous composite powder or thin film of the present invention has a large specific surface area, and it is possible to achieve a specific surface area that is normally several ten $m^2/g$ or more, and in particular several hundred $m^2/g$. This has been confirmed with a curve of nitrogen gas adsorption isotherm. The average size (diameter) of the oxide crystallite of the present invention is normally 3 to 6 nano (nm).

Further, as described later, in all of the three-dimensional structures, it is possible to structure the framework of the porous structure from nanocrystalline metal oxide crystals and a slight amount of glass phase ($SiO_2$, $P_2O_5$ and $B_2O_3$).

The glass phase is normally in an amount of roughly 2 to 10 wt %. In particular, although it is not necessary to set an upper limit, the amount thereof may be increased as necessary, and, for instance, the amount may be 10 to 20 wt %. If necessary, the amount may be increased to roughly 35 wt %.

Figure 1:
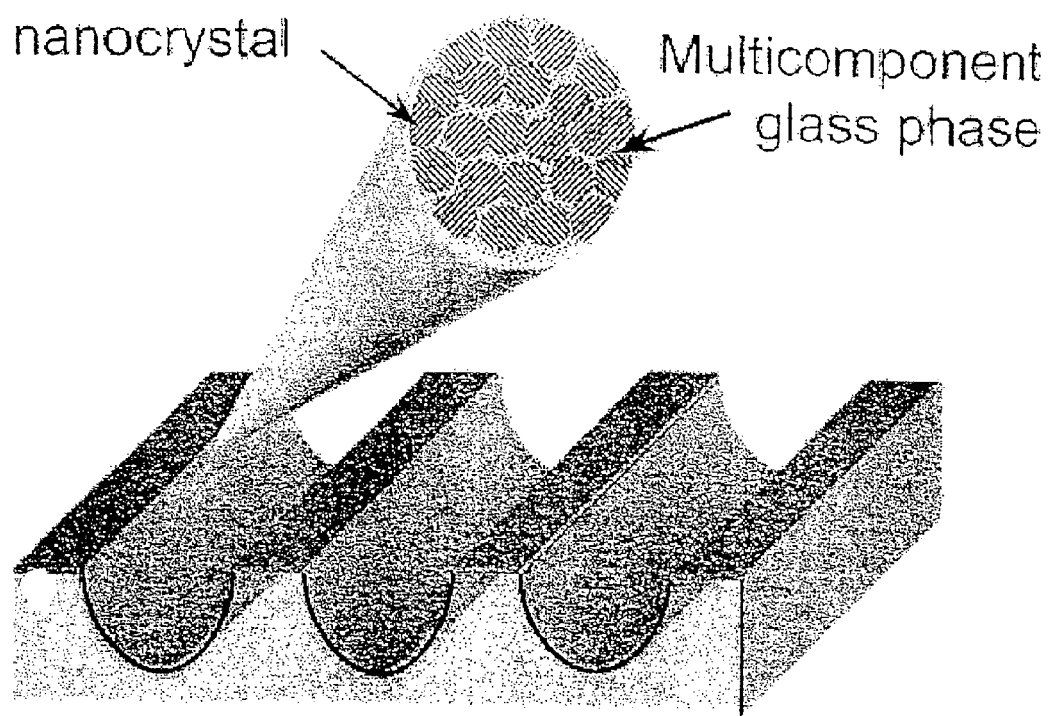
FIG. 1 is a diagram showing an image of the structure of the nanocrystal oxide—glass mesoporous composite having a three-dimensional structure.

FIG. 1 is a diagram showing an image of the structure of the nanocrystal oxide—glass mesoporous composite having a three-dimensional structure.

As shown in FIG. 1, the nanocrystal oxide—glass composite layer is configuring the mesoporous structure framework; in other words, the mesoporous structure wall, and FIG. 1 shows a state where the nanocrystals are aligned in the framework through the intervention of the glass phase.

A nanocrystal oxide—glass mesoporous composite powder (for instance, $TiO_2$—$P_2O_5$, $ZrO_2$—$P_2O_5$, $Nb_2O_5$—$P_2O_5$, $Nb_2O_5$—$SiO_2$, $WO_3$—$P_2O_5$, $TiO_2$—$SiO_2$, $WO_3$—$SiO_2$, $ZrO_2$—$SiO_2$, $ZrO_2$—$B_2O_3$, $ZrO_2$—$P_2O_5SiO_2$, $TiO_2$—$P_2O_5SiO_2$, $TiO_2$—$P_2O_5B_2O_3$) having a large specific surface area and a hexagonal or cubic three-dimensional structure is manufactured.

A block macromolecule (for example: $(EO)_{20}(PO)_{70}(EO)_{20}$=Pluronic123, BASF)) was used as the template. 0.8 to 1.2 g of $(EO)_{20}(PO)_{70}(EO)_{20}$ was placed in 8 to 10 g of ethanol solution. An aqueous solution may also be used.

Next, 2.5 g of $Ti(OC_3H_7)_4$ (as other metal oxides, $Zr(OC_4H_9)_4$, $NbCl_5$, $LiCl$, $NiCl_2$, $FeCl_3$, $CuCl_2$, $MnCl_2$, $SnCl_4$ or $WCl_5$ may be used) was added and stirred, 1 g 0.5N of hydrochloric acid (HCl) was served in drops, 1 g of $PO(C_2H_5)_3$ was further added and stirred for 20 hours, and the resultant solution was matured for about five days at room temperature to 90° C. This maturing period was associated with the temperature. The resultant solution was subject to gelation, and a $TiO_2$ (amorphous phase)—$P_2O_5$ (glass phase)—P123 having a mesostructure was synthesized.

These samples were subject to heat treatment in the atmosphere at 350 to 400° C. for roughly 6 hours to eliminate the block macromolecule P123=$(EO)_{20}(PO)_{70}(EO)_{20}$, and a mesoporous composite material having a framework of $TiO_2$ (amorphous phase)—$P_2O_5$ (glass phase) was synthesized.

Next, by additionally performing heat treatment at a higher temperature range of 400 to 600° C. for roughly 2 hours, the amorphous phase $TiO_2$ was subject to nucleation, and the cluster $TiO_2$ was grown to crystallite $TiO_2$ to form a nano-order composite.

As a result of using $P_2O_5$, which is a stable glass phase even in a high temperature, the crystallite $TiO_2$ will not grow into a particulate $TiO_2$ large enough to destroy the framework, and, by a 3 to 6 nm order uniform $TiO_2$ remaining in the framework, a nanocrystalline $TiO_2$—glass $P_2O_5$ mesoporous composite powder having a uniform size was obtained.

Using the same method as $TiO_2$—$P_2O_5$ described above, it was possible to obtain a nanocrystal oxide—glass mesoporous composite powder having a three-dimensional structure such as $ZrO_2$—$P_2O_5$, $Nb_2O_5$—$P_2O_5$, $Nb_2O_5$—$SiO_2$, $WO_3$—$P_2O_5$, $TiO_2$—$SiO_2$, $WO_3$—$SiO_2$, $ZrO_2$—$SiO_2$, $ZrO_2$—$B_2O_3$, $ZrO_2$—$P_2O_5SiO_2$, $TiO_2$—$P_2O_5SiO_2$, $TiO_2$—$P_2O_5B_2O_3$.

(Regulatory Factor and Property of Structure of Nanocrystalline $TiO_2$—glass $P_2O_5$ Mesoporous Composite Powder)

Characterization of the nanocrystalline $TiO_2$—glass $P_2O_5$ mesoporous composite powder was conducted using X-ray diffraction, transmission electron microscope and curve of nitrogen gas adsorption isotherm.

Figure 2A:
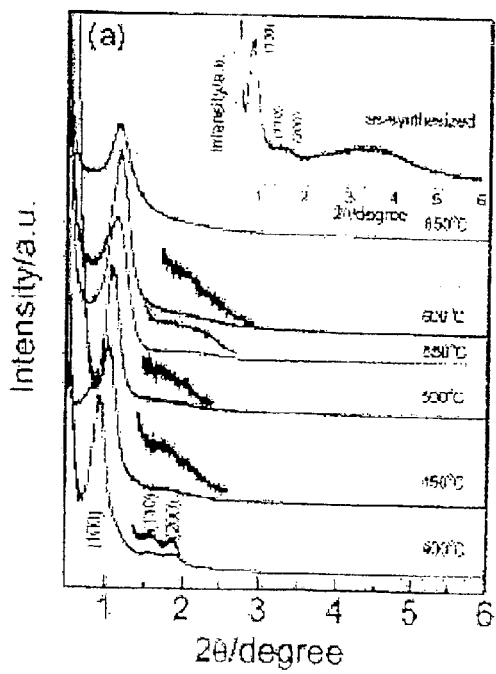
FIG. 2(a) is a diagram showing the small angle X-ray diffraction result of the nanocrystalline $TiO_2$—glass $P_2O_5$ mesoporous composite powder subject to reheat treatment before and after heat treatment and at a plurality of different temperatures.
Figure 2B:
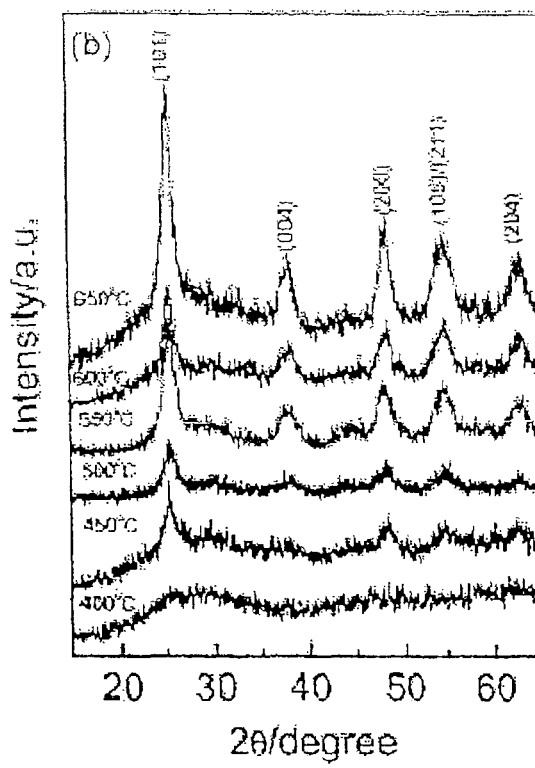
FIG. 2(b) is a diagram showing the large angle X-ray diffraction result of the nanocrystalline $TiO_2$—glass $P_2O_5$ mesoporous composite powder subject to reheat treatment before and after heat treatment and at a plurality of different temperatures.

From the small angle X-ray diffraction (FIG. 2(a)) and large angle X-ray diffraction (FIG. 2(b)) of the nanocrystalline $TiO_2$—glass $P_2O_5$ mesoporous composite powder subject to reheat treatment before and after heat treatment (sintering) at a plurality of different temperatures, it was possible to confirm that the samples subject to reheat treatment between 450° C. and 650° C. were nanocrystal oxide—glass mesoporous composite having a three-dimensional structure.

Figure 2C:
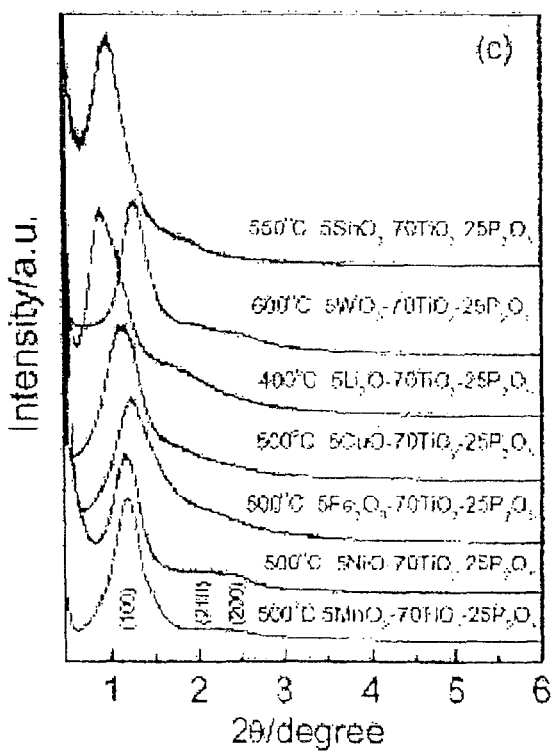
FIG. 2(c) is a diagram showing the small angle X-ray diffraction result of the nanocrystalline $TiO_2$—glass $P_2O_5$—MnO2 (—NiO, Fe2O3, CuO, Li2O, WO3, SnO2 or the like) mesoporous composite powder.
Figure 2D:
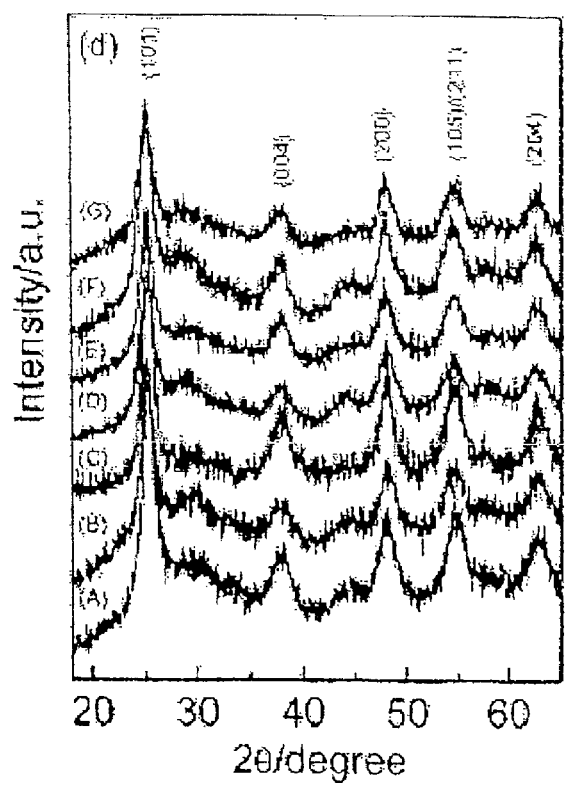
FIG. 2(d) is a diagram showing the large angle X-ray diffraction result of the nanocrystalline $TiO_2$—glass $P_2O_5$—MnO2 (—NiO, Fe2O3, CuO, Li2O, WO3, SnO2 or the like) mesoporous composite powder.

From the small angle X-ray diffraction (FIG. 2(c)) and large angle X-ray diffraction (FIG. 2(d)) of the nanocrystalline $TiO_2$—glass $P_2O_5$—$MnO_2$ (—NiO, $Fe_2O_3$, CuO, $Li_2O$, $WO_3$, $SnO_2$ or the like) mesoporous composite powder subject to reheat treatment at a plurality of different temperatures and to which was added a slight amount of dissimilar metal oxide ($MnO_2$, NiO, $Fe_2O_3$, CuO, $Li_2O$, $WO_3$, $SnO_2$ or the like), it was possible to confirm that the samples subject to reheat treatment between 450° C. and 650° C. were nanocrystal oxide—multicomponent glass mesoporous composite having a three-dimensional structure.

Figure 3A:
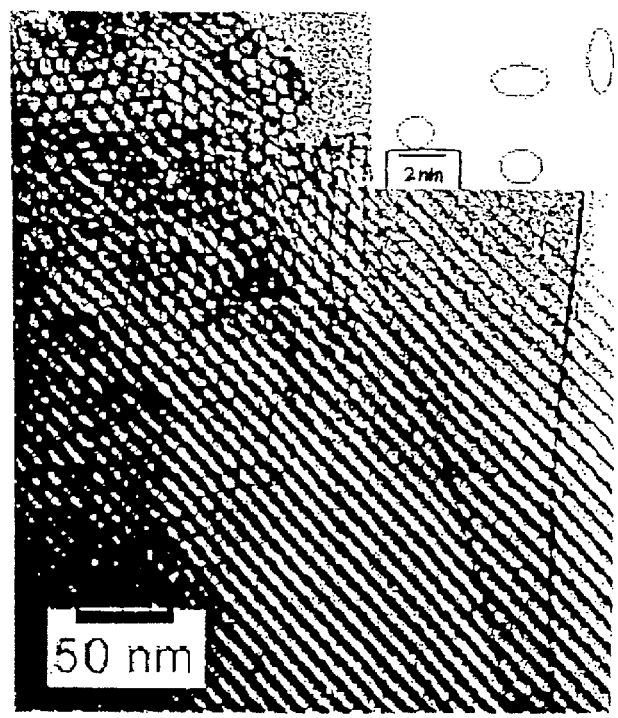
FIG. 3(a) is a transmission electron microscope photograph of the mesoporous composite material, which is $TiO_2$ (amorphous phase)—$P_2O_5$ (glass phase) after eliminating block macromolecule P123 by performing heat treatment at 400° C. for roughly 6 hours.

Further, the transmission electron microscope photograph of a mesoporous composite material, which is $TiO_2$ (amorphous phase) —$P_2O_5$ (glass phase) from which the block macromolecule P123, was eliminated by similarly performing heat treatment at 400° C. for roughly 6 hours as shown in FIG. 3(a). This showed a hexagonal crystal structure.

Figure 3B:
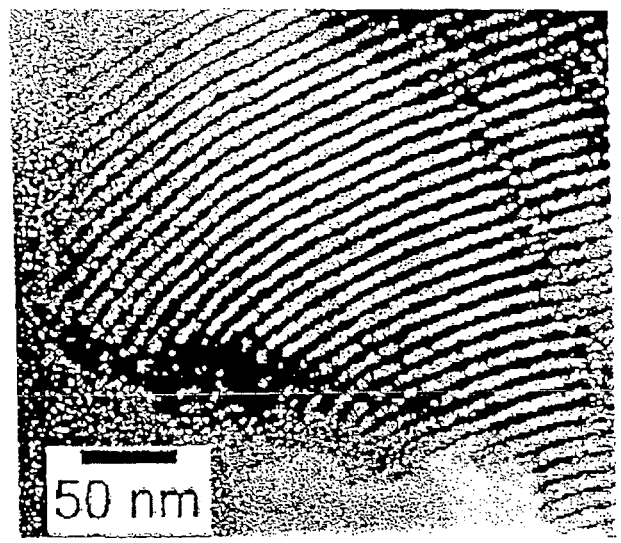
FIG. 3(b) is a transmission electron microscope photograph of nanocrystalline $TiO_2$—glass $P_2O_5$ mesoporous composite powder subject to heat treatment at 500° C. for roughly 2 hours.

The transmission electron microscope of the nanocrystalline $TiO_2$—glass $P_2O_5$ mesoporous composite powder subject to heat treatment at 500° C. for roughly 2 hours is shown in FIG. 3(b). This also showed a hexagonal crystal structure.

Figure 3C:
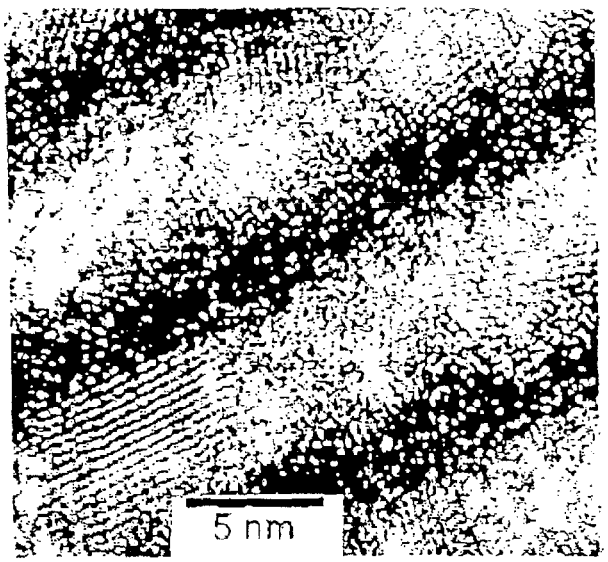
FIG. 3(c) is a transmission electron microscope photograph of the framework structured from nanosized $TiO_2$ crystallite and a slight amount of glass phase ($P_2O_5$)
Figure 3D:
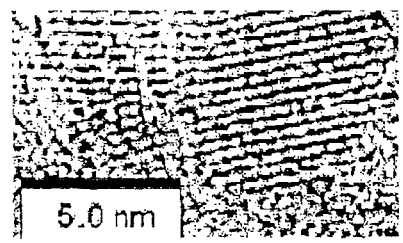
FIG. 3(d) is a transmission electron microscope photograph of the nanosized $TiO_2$ crystallite and glass phase ($P_2O_5$) contained in the framework.

It has been confirmed with the transmission electron microscope photographs (FIG. 3(c) and FIG. 3(d)) that the porous structure framework is structured from nanosized $TiO_2$ crystallite and a slight amount of glass phase ($P_2O_5$).

Figure 3E:
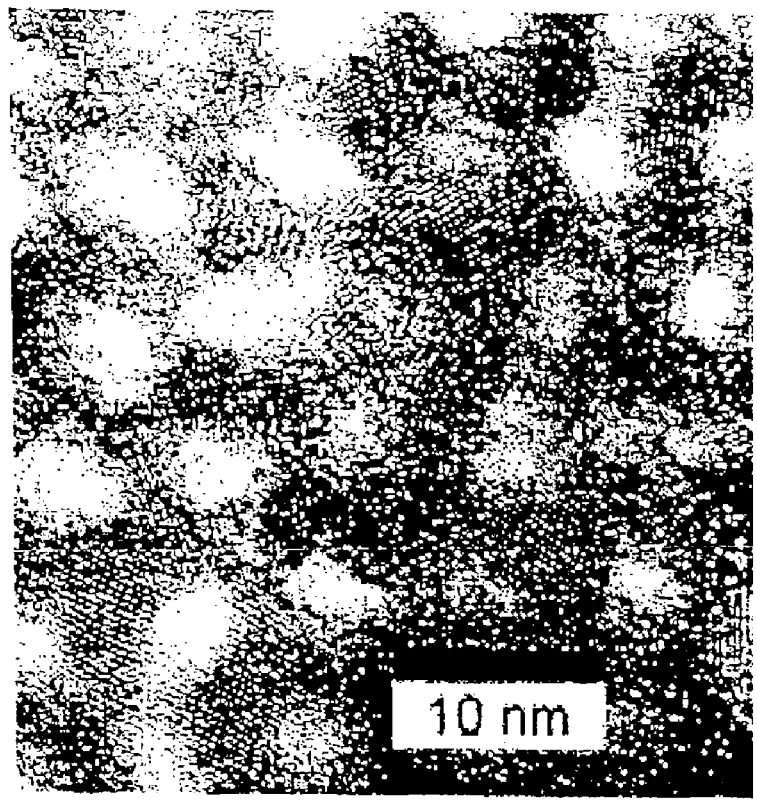
FIG. 3(e) is a transmission electron microscope photograph of the nanosized $TiO_2$ crystallite and glass phase ($P_2O_5$—$MnO_2$) composite mesoporous powder subject to heat treatment at 500° C.
Figure 3F:
FIG. 3(f) is a transmission electron microscope photograph of the nanosized $TiO_2$ crystallite and glass phase ($P_2O_5$—$MnO_2$) contained in the framework.

Further, it has been confirmed with the transmission electron microscope photographs (FIG. 3(e) and FIG. 3(f)) that the porous structure framework is structured from nanosized $TiO_2$ crystallite and a glass phase ($P_2O_5$—$MnO_2$) to which a slight amount of dissimilar metal oxide $MnO_2$ was added.

Figure 4:
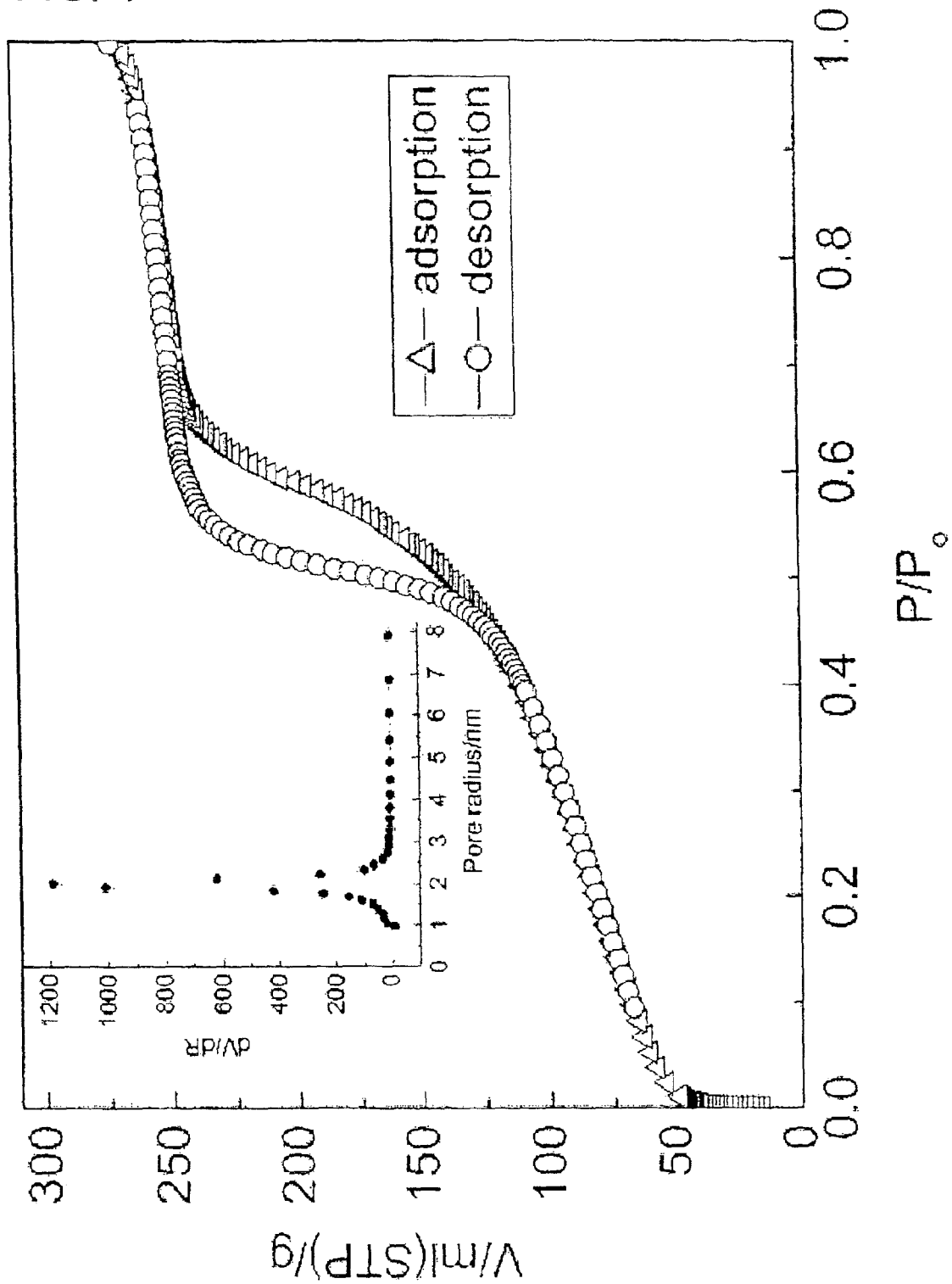
FIG. 4 is a diagram showing the nitrogen gas adsorption isotherm curve and pore size distribution of the nanocrystalline $TiO_2$—glass $P_2O_5$ mesoporous composite powder.

As a result of confirming the curve of nitrogen gas adsorption isotherm with the BET plot, the specific surface area of the nanocrystalline $TiO_2$—glass $P_2O_5$ mesoporous composite powder subject to reheat treatment at 450° C. was approximately 290 $m^2/g$. The curve of nitrogen gas adsorption isotherm and the pore size (radius) are shown in FIG. 4. The present invention was able to obtain a large specific surface area in the range of 50 to 400 $m^2/g$.

Figure 5A:
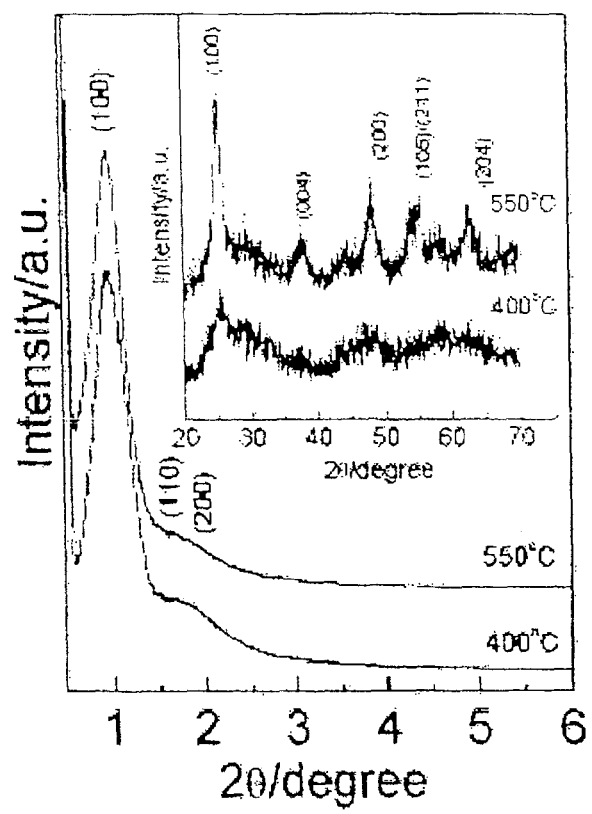
FIG. 5(a) is the small angle X-ray diffraction and large angle X-ray diffraction result of the nanocrystalline $TiO_2$—glass $SiO_2$ mesoporous composite powder.
Figure 5B:
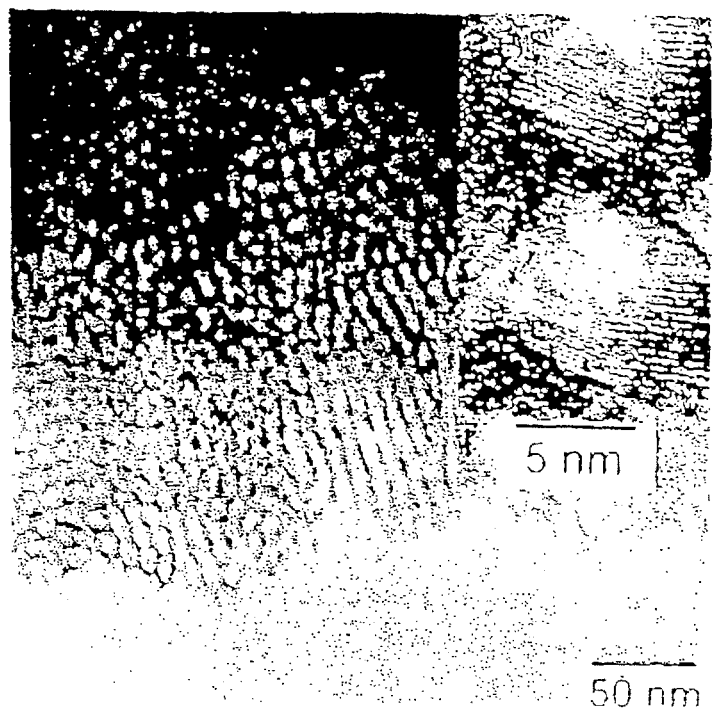
FIG. 5(b) is a transmission electron microscope photograph of the nanocrystalline $TiO_2$—glass $SiO_2$ mesoporous composite powder.

The glass phase was changed, and the small angle X-ray diffraction and large angle X-ray diffraction result of the nanocrystalline $TiO_2$—glass $SiO_2$ mesoporous composite powder is shown in FIG. 5(a), and the transmission electron microscope photograph is shown in FIG. 5(b).

Figure 5C:
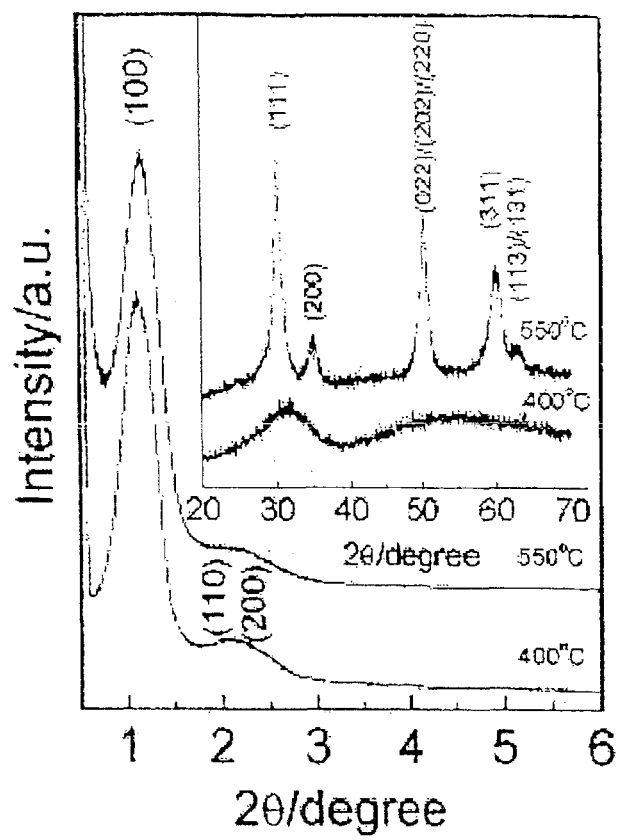
FIG. 5(c) is a diagram showing the small angle X-ray diffraction and large angle X-ray diffraction result of the nanocrystalline $ZrO_2$—glass $P_2O_5$ mesoporous composite powder.
Figure 5D:
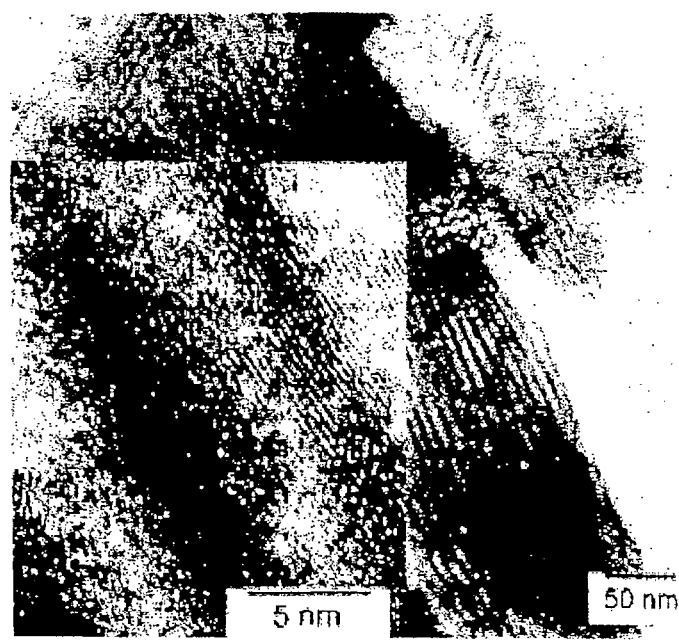
FIG. 5(d) is a transmission electron microscope photograph of the nanocrystalline $ZrO_2$—glass $P_2O_5$ mesoporous composite powder.

The crystallite phase metal oxide was changed, and the small angle X-ray diffraction and large angle X-ray diffraction result of the nanocrystalline $ZrO_2$—glass $P_2O_5$ mesoporous composite powder is shown in FIG. 5(c), and the transmission electron microscope photograph is shown in FIG. 5(d).

Next, the secondary battery and lithium storage device of the present invention are explained. Incidentally, the nanocrystal oxide—glass mesoporous composite material having the three-dimensional structure with mesopores and the manufacturing method thereof can all be applied to the secondary battery and lithium storage device.

The electrode formed from mesoporous composite of the nanocrystalline metal oxide ($TiO_2$)—the glass phase ($P_2O_5$) of inorganic oxide of the present invention in which three-dimensionally uniform pores are regularly arranged has a high reversible capacity of 320 to 380 m Ah/g at a charging or discharging rate of 0.1 A/g, and 220 to 280 mAh/g at a charging or discharging rate of 10 A/g.

The average diameter of pores was 2 nm to 6 nm, and numerous microcrystals of several nano-order (2 to 7 nm) anatase $TiO_2$ were condensed into the mesoporous $TiO_2$—$P_2O_5$ framework having a hexagonal or cubic structure.

Figure 6:
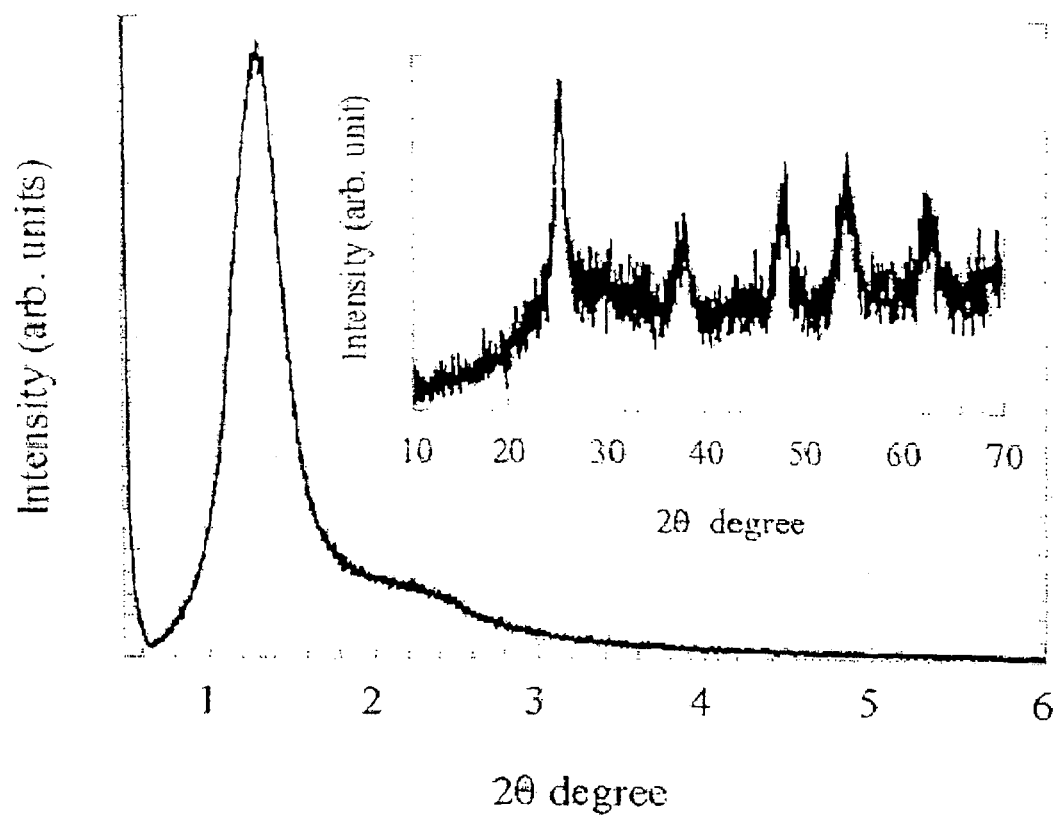
FIG. 6 is a diagram showing the small angle X-ray diffraction pattern and wide angle X-ray diffraction pattern of mesoporous composite of the nanocrystalline metal oxide ($TiO_2$)—the glass phase ($P_2O_5$) of inorganic oxide in which the size and structure of the pores are three-dimensionally controlled.

FIG. 6 shows the small angle X-ray diffraction pattern and wide angle X-ray diffraction pattern of mesoporous composite of the nanocrystalline metal oxide ($TiO_2$)—the glass phase ($P_2O_5$) of inorganic oxide.

In the small angle X-ray diffraction (XRD) pattern, it is possible to observe the diffraction peak of (100), (110) and (200) of the hexagonal crystal structure.

Further, in the wide angle X-ray diffraction pattern, it is possible to clearly observe the five diffraction peaks of (101), (004), (200), (211) and (204) of the anatase $TiO_2$ structure. This kind of broad diffraction peak suggests that the size of the anatase $TiO_2$ microcrystal is roughly 4 to 5 nano.

Figure 7:
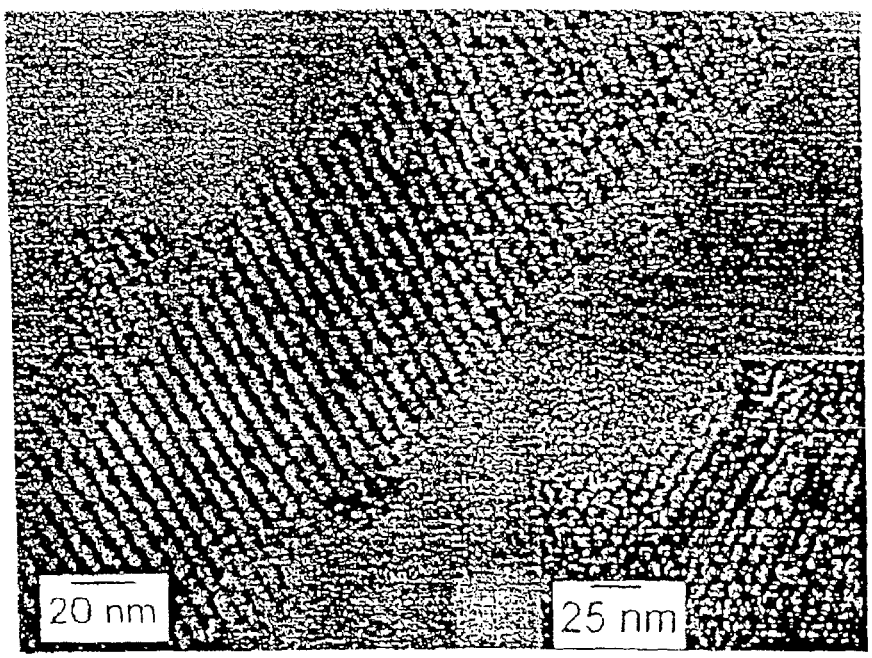
FIG. 7 is a diagram showing the results of using a transmission electron microscope to observe mesoporous composite of the nanocrystalline metal oxide ($TiO_2$)—the glass phase ($P_2O_5$) of inorganic oxide in which the size and structure of the pores are three-dimensionally controlled.
Figure 7:

FIG. 7 shows the observation results of using a transmission electron microscope to observe mesoporous composite of the nanocrystalline metal oxide ($TiO_2$)—the glass phase ($P_2O_5$) of inorganic oxide in which three-dimensionally uniform pores are regularly arranged. It is possible to confirm mesoporous composite of nanocrystalline metal oxide ($TiO_2$)—a glass phase ($P_2O_5$) of inorganic oxide having a hexagonal structure in which roughly 4 nm uniform pores are aligned.

Figure 8:
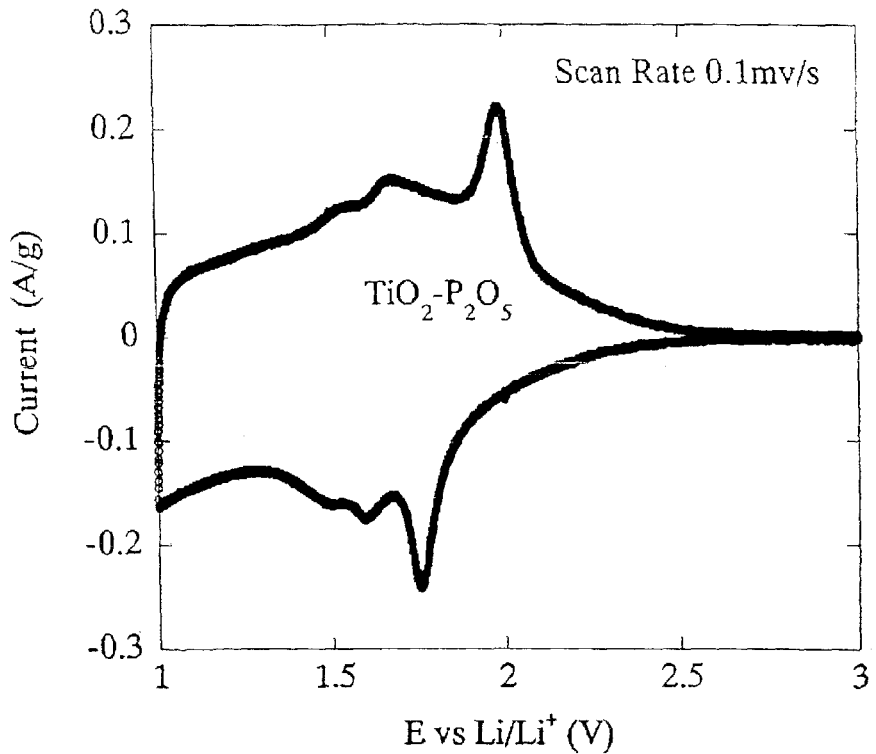
FIG. 8 is a cyclic voltommagram of mesoporous composite of the nanocrystalline metal oxide ($TiO_2$)—the glass phase ($P_2O_5$) of inorganic oxide in which the size and structure of the pores are three-dimensionally controlled.

FIG. 8 shows a cyclic voltommagram in a potential of 1.0V to 4.0V (vs. $Li/Li^+$) of mesoporous composite of the nanocrystalline metal oxide ($TiO_2$)—the glass phase ($P_2O_5$) of inorganic oxide in which three-dimensionally uniform pores are regularly arranged according to the present invention. The scanning speed was 0.1 mV/s.

Figure 9:
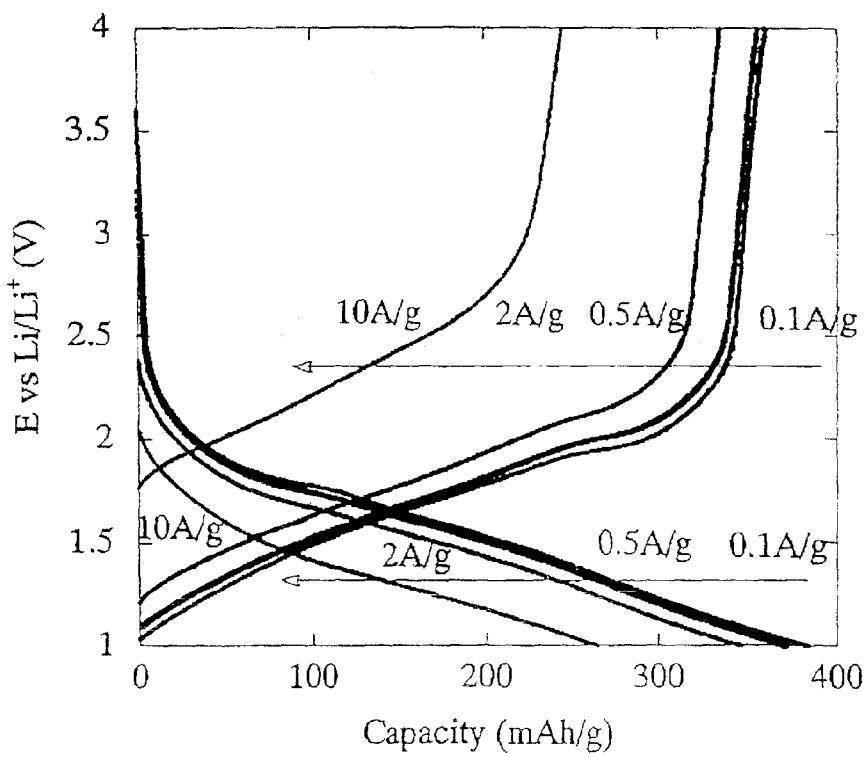
FIG. 9 is a diagram showing the constant current charge/discharge characteristics of mesoporous composite of the nanocrystalline metal oxide ($TiO_2$)—the glass phase ($P_2O_5$) of inorganic oxide in which the size and structure of the pores are three-dimensionally controlled.

FIG. 9 shows the constant current charge/discharge characteristics of mesoporous composite of the nanocrystalline metal oxide ($TiO_2$)—the glass phase ($P_2O_5$) of inorganic oxide in which three-dimensionally uniform pores are regularly arranged. The current density of charging/discharging was 0.1 A/g, 0.5 A/g, 2 A/g, 10 A/g. By performing constant current charging/discharging, it was possible to measure the intercalation capacity of lithium to anatase $TiO_2$.

In the discharging (reduction) process, when the current density was 0.1 A/g, 0.5 A/g, 2 A/g and 10 A/g, the discharging capacity was 382 mAh/g, 373 mAh/g, 347 mAh/g and 257 mAh/g, respectively. Further, when the current density was 0.1 A/g, 0.5 A/g, 2 A/g and 10 A/g, the charging capacity was 347 mAh/g, 342 mAh/g, 333 mAh/g and 243 mAh/g, respectively.

Figure 10:
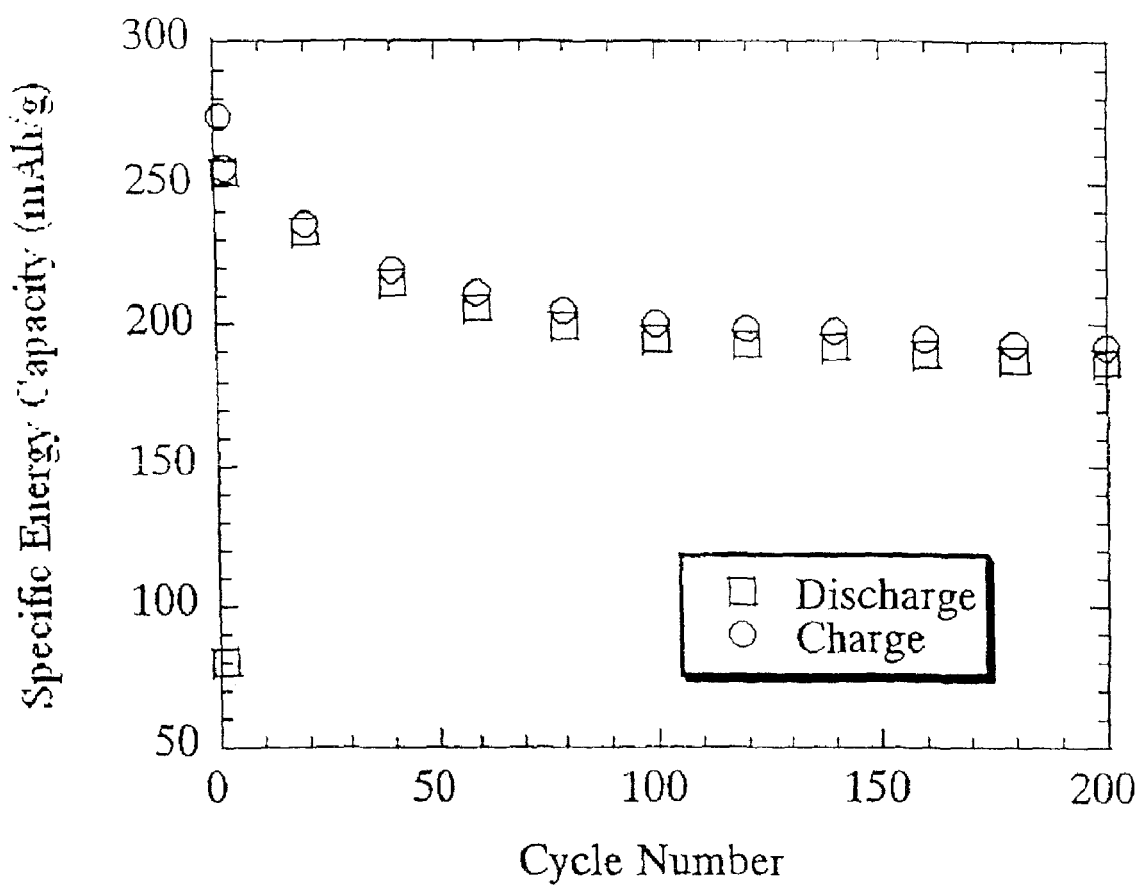
FIG. 10 is a diagram showing the cycle characteristics of mesoporous composite of the nanocrystalline metal oxide ($TiO_2$)—the glass phase ($P_2O_5$) of inorganic oxide in which the size and structure of the pores are three-dimensionally controlled.

FIG. 10 shows the cycle characteristics (current density of charging/discharging=10 A/g) of mesoporous composite of the nanocrystalline metal oxide ($TiO_2$)—the glass phase ($P_2O_5$) of inorganic oxide in which the size and structure of the pores are three-dimensionally controlled.

The second discharging capacity (intercalation of lithium) and charging capacity (deintercalation of lithium) were roughly in the vicinity of 240 m Ah/g ($Li_xTiO_2$, x=0.7), and was stable at roughly in the vicinity of 180 m Ah/g ($Li_xTiO_2$, x=0.5 to 0.6) even after the charging and discharging at several hundred cycles.

Although $TiO_2$ was used as a representative example of nanocrystalline metal oxide in the foregoing description, other nanocrystalline metal oxides such as $TiO_2$, NiO, $MnO_2$, FeO, $Fe_2O_3$, $Fe_3O_4$, CoO, $CoO_2$, $CrO_2$, $Co_3O_4$, $WO_3$, SnO, $SnO_2$ or the mixtures thereof also yielded the same results.

Although ($P_2O_5$) was used in the explanation of the glass phase, other materials; in other words, inorganic oxides such as $SiO_2$ and $B_2O_3$ also yielded the same results.

Figure 11:
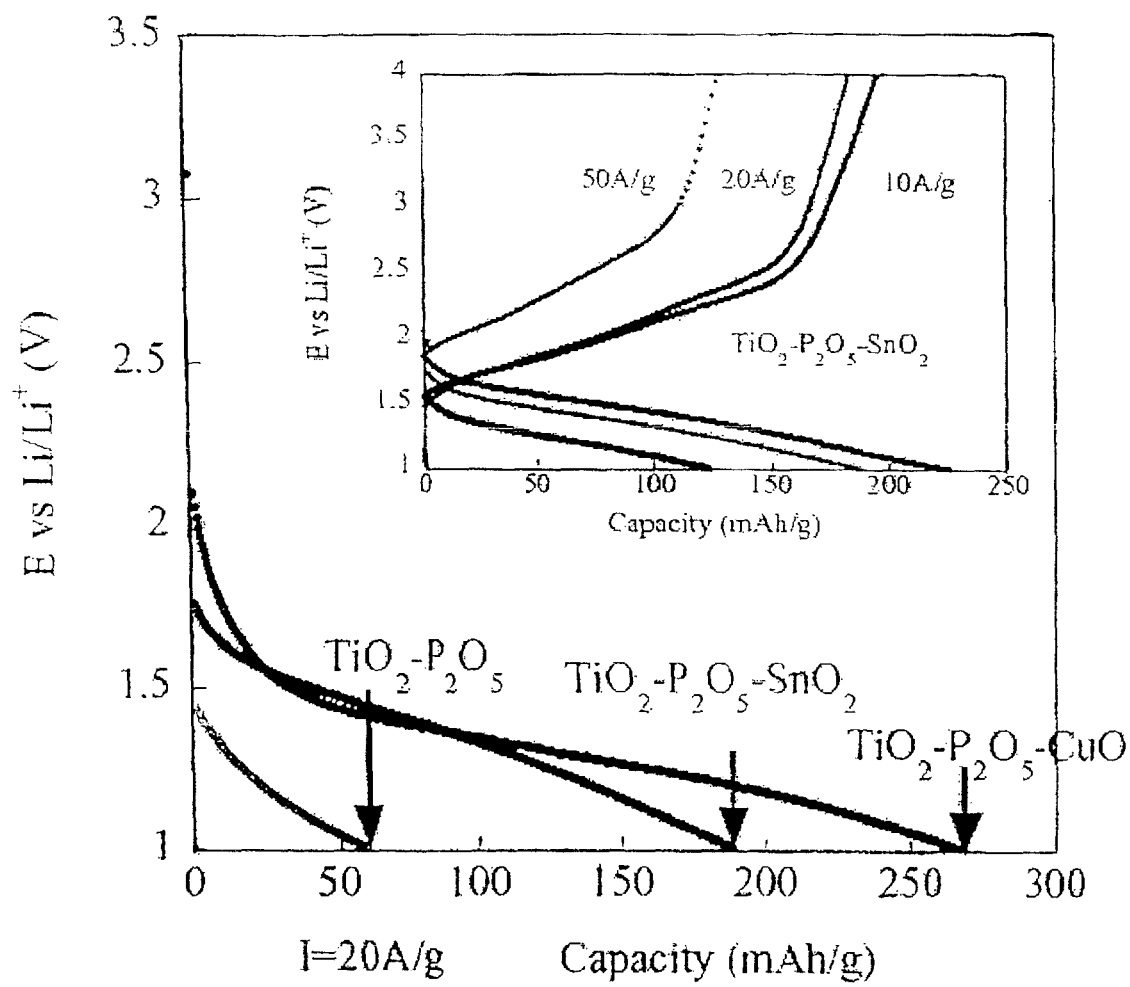
FIG. 11 is a diagram showing the constant current charge/discharge characteristics of mesoporous composite of nanocrystalline metal oxide ($TiO_2$)—inorganic oxide glass phase ($P_2O_5$)—dissimilar metal oxide (CuO and $SnO_2$) in which the size and structure of the pores are three-dimensionally controlled.

FIG. 11 shows the constant current charge/discharge characteristics of mesoporous composite of the nanocrystalline metal oxide ($TiO_2$)—the glass phase ($P_2O_5$) of inorganic oxide—dissimilar metal oxide (CuO and $SnO_2$) in which the size and structure of the pores are three-dimensionally controlled.

When the current density of discharging was 20 A/g, the discharging capacity density of $TiO_2$—$P_2O_5$, $TiO_2$—$P_2O_5$—$SnO_2$ and $TiO_2$—$P_2O_5$—CuO was 65 m Ah/g, 195 m Ah/g and 270 m Ah/g, respectively.

Further, in the discharging (reduction) process performed to $TiO_2$—$P_2O_5$—$SnO_2$, the current density was 10 A/g, 20 A/g, 50 A/g, and the discharging capacity was 230 m Ah/g, 195 m Ah/g, 178 m Ah/g, respectively.

As a result of adding a slight amount of dissimilar metal oxide having electron conduction, an electronic conductive path based on electronic conductive metal oxide was structured in a glass network of mesoporous framework of the nanocrystalline metal oxide ($TiO_2$)—the glass phase ($P_2O_5$) of inorganic oxide.

As a result, high-speed constant current charge/discharge characteristics were further improved. Results of $TiO_2$—$P_2O_5$—$SnO_2$ and $TiO_2$—$P_2O_5$—CuO shown in FIG. 11 suggest such improvement.

In addition, the same result was obtained upon adding one or more components selected from $MnO_2$, NiO, $Fe_2O_3$, $Li_2O$ and $WO_3$.

The energy density and power density sought from the high current charging/discharging capacity of mesoporous composite of nanocrystalline metal oxide ($TiO_2$)—the glass phase ($P_2O_5$) of inorganic oxide and mesoporous composite of nanocrystalline metal oxide ($TiO_2$)—glass phase ($P_2O_5$) of inorganic oxide—dissimilar metal oxide (CuO and $SnO_2$) in which three-dimensionally uniform pores are regularly arranged exceed the desired value of a super capacitor required for electric vehicles.

In other words, mesoporous composite of nanocrystalline metal oxide—the glass phase of inorganic oxide-dissimilar metal oxide is applicable to electric vehicles as a super capacitor.

INDUSTRIAL APPLICABILITY

Not only is this manufacturing method of mesoporous composite of a nanocrystal oxide—glass composite having a three-dimensional structure an extremely simple method, the porous structure framework is structured from nanocrystalline and a slight amount of glass phase.

Based on these characteristics, the present invention may be applied to technology concerning lithium intercalation electric devices, photocatalytic devices, solar batteries, and energy storage devices.

In addition, the mesoporous composite formed from nanocrystalline metal oxide (one or more types of metal oxide selected from $TiO_2$, NiO, $MnO_2$, FeO, $Fe_2O_3$, $Fe_3O_4$, CoO, $CoO_2$, $CrO_2$, $Co_3O_4$, $WO_3$, SnO, $SnO_2$)-inorganic oxide glass phase (one or more types selected from $P_2O_5$, $SiO_2$, $B_2O_3$)-dissimilar metal oxide (one or more types selected from $MnO_2$, NiO, $Fe_2O_3$, CuO, $Li_2O$, $WO_3$, $SnO_2$) of the present invention may also be applied to energy storage devices such as secondary batteries (including lithium secondary batteries), electrochemical capacitors, pseudo-capacitor, and super capacitor.

Not only is this manufacturing method of mesoporous composite of nanocrystalline metal oxide—inorganic oxide of a glass phase—dissimilar metal oxide having a three-dimensional structure an extremely simple method, it is also possible to control the size and structure of the pores.

Further, the surface area is large, has a regularly arranged hexagonal or cubic structure, and, in particular, numerous metal oxide microcrystals as a several nano-order (2 to 7 nm) active material are congested in the framework.

Since electrolyte and lithium ion can be easily placed in the nanopores, the nanopores become the ionic conductive path, and the dissimilar metal oxide attached to the glass phase become electron conductive gas. As a result of utilizing these characteristics, the present invention is applicable to an electrode material for used in secondary batteries capable of even faster charging/discharging.

The invention claimed is:

1. A nanocrystal oxide—glass mesoporous composite powder or film having a three-dimensional structure with regularly arranged mesopores and in which a glass phase contains $P_2O_5$.

2. A nanocrystal oxide—glass mesoporous composite powder or film having a hexagonal or cubic three-dimensional structure and in which a glass phase contains $P_2O_5$.

3. A nanocrystal oxide—glass mesoporous composite powder or film according to claim 2, wherein a porous structure framework contains uniform nanocrystal oxides.

4. A nanocrystal oxide—glass mesoporous composite powder or film according to claim 2, wherein the powder or film has a large specific surface area in a range of 50 to 400 $m^2/g$.

5. A manufacturing method of nanocrystal oxide—glass mesoporous composite powder according to claim 1, comprising the steps of:
using a block macromolecule or interface activating agent as a template, and adding hydrochloric acid (HCl) to an aqueous solution of metal alkoxide, metal chloride, or $PO(OC_2H_5)_3$ or a solution obtained by dissolving these in alcohol such as ethanol;
manufacturing powder having a glass phase metal oxide—inorganic oxide composite mesostructure with a sol-gel process;
maturing and gelling this between room temperature and 90° C.;
removing the block macromolecule or interface activating agent by performing heat treatment thereto in the atmosphere at 350 to 400° C. and manufacturing a glass phase metal oxide—glass phase mesoporous composite film; and
additionally performing heat treatment thereto at 400 to 700° C. so as to change the phase of the glass phase metal oxide into crystallite.

6. A method according to claim 5, wherein an inorganic oxide of a stable glass phase is $P_2O_5$.

7. A method according to claim 5, wherein a dissimilar metal oxide selected from a group consisting of $MnO_2$, NiO, $Fe_2O_3$, CuO, $Li_2O$, $WO_3$ and $SnO_2$ is added in a slight amount at a synthesizing stage, and the mesoporous powder is formed from a nanocrystal oxide, a glass phase of inorganic oxide, and said dissimilar metal oxide having a multicomponent glass phase.

8. A method according to claim 5, wherein metal alkoxide or metal chloride is $Ti(OC_3H_7)_4$, $Zr(OC_4H_9)_4$, $NbCl_5$, LiCl, $NiCl_2$, $FeCl_3$, $CuCl_2$, $MnCl_2$, $SnCl_4$ or $WCl_5$.

9. A method according to claim 5, wherein said powder is used in the manufacture of a lithium battery, lithium intercalation electric device, photocatalytic device, solar battery, or energy storage device.

10. A manufacturing method of nanocrystal oxide—glass mesoporous composite film according to claim 1, comprising the steps of:
using a block macromolecule or interface activating agent as a template, adding hydrochloric acid (HCl) to metal alkoxide, metal chloride, or an aqueous solution of $PO(OC_2H_5)_3$ or a solution obtained by dissolving these in alcohol such as ethanol, and obtaining a sol solution by performing hydrolysis while adjusting the pH;
forming a film having a glass phase metal oxide-inorganic oxide-block macromolecule or interface activating agent composite mesostructure on a substrate by delivering the sol solution in drops onto a substrate, rapidly rotating the substrate, and evaporating and gelling the solvent;
maturing and gelling this between room temperature and 90° C.;
removing the block macromolecule or interface activating agent by performing heat treatment thereto in the atmosphere at 350 to 400° C. and manufacturing a glass phase metal oxide—glass phase mesoporous composite film; and
additionally performing heat treatment thereto at 400 to 700° C. so as to change the phase of the glass phase metal oxide into crystallite.

11. A method according to claim 10, wherein an inorganic oxide of a stable glass phase is $P_2O_5$.

12. A method according to claim 10, wherein a dissimilar metal oxide selected from a group consisting of $MnO_2$, NiO, $Fe_2O_3$, CuO, $Li_2O$, $WO_3$ and $SnO_2$ is added in a slight amount at a synthesizing stage, and the mesoporous film is formed from a nanocrystal oxide, a glass phase of inorganic oxide, and said dissimilar metal oxide having a multicomponent glass phase.

13. A method according to claim 10, wherein metal alkoxide or metal chloride is $Ti(OC_3H_7)_4$, $Zr(OC_4H_9)_4$, $NbCl_5$, LiCl, $NiCl_2$, $FeCl_3$, $CuCl_2$, $MnCl_2$, $SnCl_4$ or $WCl_5$.

14. A method according to claim 10, wherein said film is used in the manufacture of a lithium battery, lithium intercalation electric device, photocatalytic device, solar battery, or energy storage device.

15. A secondary battery having said nanocrystal oxide—glass mesoporous composite film according to claim 1, said film forming a nanocrystal oxide—glass mesoporous composite electrode of said secondary battery.

16. The secondary battery according to claim 15, wherein the average diameter of said mesopores is 2 nm to 10 nm.

17. A secondary battery according to claim 15, wherein a framework of the nanocrystal oxide—glass mesoporous composite electrode has a hexagonal or cubic structure and contains uniform crystallite oxides of several nano-orders.

18. A secondary battery according to claim 17, wherein a thickness of a wall of the framework is 2 nm to 9 nm.

19. A secondary battery according to claim 15, wherein the nanocrystal oxide is one or more types of metal oxides selected from the group consisting of $TiO_2$, $NiO$, $MnO_2$, $FeO$, $Fe_2O_3$, $Fe_3O_4$, $CoO$, $CoO_2$, $CrO_2$, $CO_3O_4$, $WO_3$, $SnO$ and $SnO_2$.

20. A secondary battery according to claim 15, wherein the glass phase includes one or more inorganic oxides selected from the group consisting of $SiO_2$ and $B_2O_3$.

21. A secondary battery according to claim 15, wherein the glass phase is a multicomponent glass phase containing one or more metal oxides selected from the group consisting of $MnO_2$, $NiO$, $Fe_2O_3$, $CuO$, $Li_2O$, $WO_3$ and $SnO_2$ at a molar ratio of 2% to 60% in relation to the glass phase.

22. A secondary battery according to claim 15, wherein both an ionic conductive path and electronic conductive path are provided in a framework of the nanocrystal oxide—glass mesoporous composite electrode by adding ion conductive or electron conductive dissimilar metal oxides in a network-shaped glass phase at a molar ratio of 2% to 60% in relation to the glass phase.

23. A secondary battery according to claim 15, wherein the nanocrystal oxide—glass mesoporous composite is used as the electrode of the secondary battery, and its energy density of charging or discharging is able to maintain a rate of more than 60% of 0.1 A/g even when increasing the charging or discharging rate to ten times 0.1 A/g (1.0 A/g), and even one hundred times 0.1 A/g (10 A/g).

24. A secondary battery according to claim 15, wherein the nanocrystal oxide—glass mesoporous composite is used as the electrode of the secondary battery so as to increase the surface area, and the charging/discharging capacity has a large capacity of 1.0 to 5.0 times the maximum theoretical capacity in relation to active oxides selected from the group consisting of $TiO_2$, $NiO$, $MnO_2$, $FeO$, $Fe_2O_3$, $Fe_3O_4$, $CoO$, $CoO_2$, $CrO_2$, $Co_3O_4$, $WO_3$, $SnO$ and $SnO_2$.

25. A secondary battery according to claim 15, wherein the nanocrystal oxide—glass mesoporous composite is used as the electrode of the secondary battery, and a high reversible ratio of 95% or higher is realized even when increasing the charging or discharging rate to ten times 0.1 A/g (1.0 A/g), and even one hundred times 0.1 A/g (10 A/g).

26. A secondary battery according to claim 15, wherein the nanocrystal oxide—glass mesoporous composite is used as the electrode of lithium, and a high reversible capacity of 60% to 70% or higher of the initial capacity is realized after a charging/discharging cycle of several hundred cycles even when increasing the charging or discharging rate to ten times 0.1 A/g (1.0 A/g), and even one hundred times 0.1 A/g (10 A/g).

27. A secondary battery according to claim 15, wherein a nanocrystal oxide—a glass phase of inorganic oxide—dissimilar metal oxide to which a slight amount of dissimilar metal oxide was added has a high reversible capacity at a rate of 40% to 70% or higher of 0.1 A/g even when the charging/discharging rate is increased to a rate of one hundred times, five hundred times or one thousand times 0.1 A/g.

28. A secondary battery according to claim 15, wherein the battery has a high reversible ratio, r >95%.

29. A nanocrystal oxide—glass mesoporous composite powder or film according to claim 1, wherein a porous structure framework contains uniform nanocrystal oxides.

30. A nanocrystal oxide—glass mesoporous composite powder or film according to claim 1, wherein the powder or film has a large specific surface area in a range of 50 to 400 $m^2/g$.

* * * * *

UNITED STATES PATENT AND TRADEMARK OFFICE
CERTIFICATE OF CORRECTION

PATENT NO. : 7,771,871 B2
APPLICATION NO. : 10/595856
DATED : August 10, 2010
INVENTOR(S) : Haoshen Zhou et al.

It is certified that error appears in the above-identified patent and that said Letters Patent is hereby corrected as shown below:

Column 11, line 66, -- composite film; -- should read -- composite powder --

Signed and Sealed this
Eighth Day of November, 2011

David J. Kappos
*Director of the United States Patent and Trademark Office*